Nov. 29, 1955 L. L. LAURENCE ET AL 2,725,337
METHOD AND APPARATUS FOR LOW TEMPERATURE SEPARATION
AND STABILIZATION OF LIQUID HYDROCARBONS
FROM HIGH PRESSURE NATURAL GAS
Filed Dec. 2, 1952

INVENTORS.
Lawton L. Laurence
Charles W. Hayes.
BY
Fishburn & Mullendore
ATTORNEYS.

2,725,337
METHOD AND APPARATUS FOR LOW TEMPERATURE SEPARATION AND STABILIZATION OF LIQUID HYDROCARBONS FROM HIGH PRESSURE NATURAL GAS

Lawton L. Laurence and Charles W. Hayes, Oklahoma City, Okla., assignors to Black, Sivalls & Bryson, Inc., Kansas City, Mo., a corporation of Delaware Application December 2, 1952, Serial No. 323,647

14 Claims. (Cl. 196—11)

This invention relates to the processing of high pressure natural gas at the field of production to obtain maximum recovery of stabilized liquid constituents from the gas, thereby increasing the income of the producer by the amount of the liquid hydrocarbons recovered and providing a high quality sales gas free from water vapor and condensible hydrocarbons which ordinarily interfere with operation of the gathering and pipe line systems.

The free water and water vapor content of the natural gas may be removed and condensation of the hydrocarbons constituents may be readily effected by low temperature and high pressure separation, but the practice has been hindered by the formation of gas hydrates at such temperatures, and such practices are particularly inoperative at the temperature under which maximum recovery of the liquid hydrocarbons can be obtained. This difficulty can be eliminated by injecting a hydrate inhibitor such as glycol into the influent gas stream after the free water has been removed, but this presents an economic problem because of loss of the inhibitor or the need of extra heating equipment to facilitate separation of the glycol from the recovered condensate.

Another difficulty is that the increased condensate recovery under low temperature and high pressure separation results in an increased amount of the lighter hydrocarbons (propanes and lighter) in the condensate. If this condensate is placed in a stock tank at normal temperatures and pressures the lighter hydrocarbons flash out of the liquid and carry some of the heavier hydrocarbons with them. Consequently, this loss presents problems in the handling of the condensate in order to obtain the benefits of low temperature and high pressure separation.

Therefore, the principal object of the present invention is to avoid these difficulties by providing a high pressure low temperature separating method and apparatus in combination with a stabilizing method and apparatus by which a maximum amount of condensate is recovered and stabilized at the temperature and pressure maintained in the stock tank, which are usually atmospheric.

A further object of the invention is to obtain the refrigeration which is required in the low temperature separation by expanding the gas into a separation zone in the presence of a hydrate inhibitor to obtain maximum condensation and separation of the liquid hydrocarbons without the formation of objectionable gas hydrates and to ultimately obtain economic separation and recovery of the inhibitor incidental to stabilization of the liquid hydrocarbons.

Other objects of the invention are to utilize the cold separated gas from the condensing zone for cooling the stabilized hydrocarbons susbtantially to the temperature maintained in the stock tank and to provide for reactivation of the inhibitor for recontact with the influent gas.

In accomplishing these and other objects of the invention we have provided improved methods and apparatus illustrated in the accompanying drawing wherein.

Figure 1:
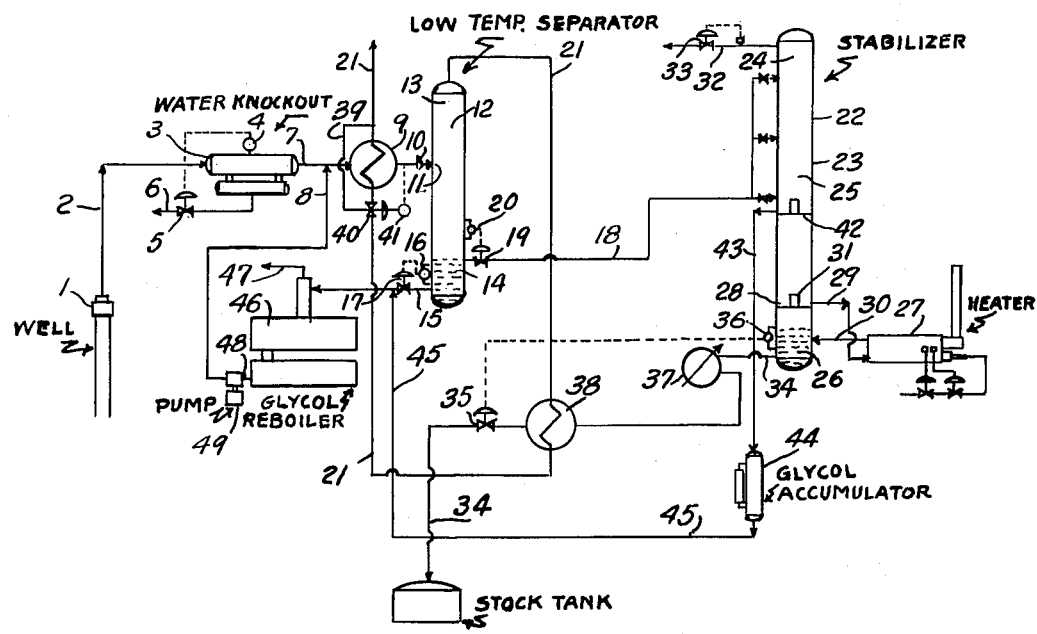
Fig. 1 is a diagrammatic view of an apparatus assembled in accordance with the present invention for practicing our preferred method.

Referring more in detail to the drawings:

1 designates a petroleum producing well or other source of a high pressure stream of hydrocarbon fluid. Such streams may flow under pressures as high as 5,000 p. s. i. g. and usually consist of a mixture of natural gas containing normally liquid hydrocarbons, water vapor, and free liquids including water and from which it is desired to remove the objectionable liquid such as water and to recover the desirable, normally liquid hydrocarbons at or near the field of production. The gas free of condensibles and water vapor may then be passed into the gathering lines of a pipe line system, or the gas may be used for repressuring the producing formation without interference by freezing and plugging of the lines by gas hydrates. The recovery of the normally liquid hydrocarbon condensates is also an important item in the economics of petroleum production in that the hydrocarbon condensates are a highly saleable product which would otherwise be lost to the producer.

It is a purpose of the present invention to obtain the hydrocarbon condensates and effect stabilization thereof with simple equipment by utilizing the energy of the gas stream in carrying out the various changes in temperature and pressures which are required to perform the steps of our method.

In keeping with the present invention, the first step is to remove the objectionable liquids such as free water and any free liquid hydrocarbons that are present in the gas stream. Therefore, the well stream is brought from the well 1 through a pipe line or duct 2 into a high pressure water knock-out separator 3 wherein the free water and any heavy hydrocarbon oils settle out. The free water is removed from the remaining portions of the stream by aid of a conventional inter-facial level controller 4 which actuates a valve 5 in a water draw-off duct 6.

The remaining portions of the gas stream now consist of a mixture of vapors or a mixture of vapors and hydrocarbon liquids, and these are removed from the separator 3 through a duct 7. The high pressure gas exists at a temperature substantially higher than the temperature at which the solid gas hydrates are produced, but since the gas flowing through the duct 7 contains water vapor means must be provided to prevent formation of gas hydrates. This is accomplished in the present method, by a hydrate inhibitor which is introduced into the gas through a pipe connection 8 before the stream is cooled toward the temperature at which the water vapor combines with components of the gas in forming gas hydrates.

The gas stream containing the inhibitor is now precooled toward the desired low temperature by passing it through a heat exchanger 9. As above stated, the gas stream exists at a high pressure greatly in excess of the ultimate pipe line pressure so that it may be brought to the desired low temperature by expansion to a lower pressure. This is effected by discharging the gas through an expansion valve 10 into a pipe connection 11 with a high pressure separator 12. The fluid stream on expansion through the valve 10 is chilled to a substantially low temperature which is maintained within the entire gas and liquid space 13 and 14 of the separator 12. The resulting temperature of the gas stream may be for example as low as 40° F. depending upon conditions at which maximum condensation of the hydrocarbon components of the initial stream is obtained. The liquid components of the flow, together with the condensates drop into the lower portion of the separator and collect in a liquid body 14. Some of the hydrate inhibitor (glycol) containing adsorbed water may collect in a layer below the hydrocarbon condensate and may be drawn off through a duct 15 under control of an interface controller 16 that actuates a discharge valve 17 in the water draw-off duct 15.

The separated hydrocarbon condensates and most of the glycol exists as a mixture in the liquid body 14 and the mixture is removed from the separator 12 through a discharge duct 18 having a valve 19 that is operated by a liquid level controller 20 so as to maintain a fixed level of the body of liquid in the separator.

The hydrate inhibitor eliminates the formation of troublesome hydrates and therefore no heat is required within the separator to melt hydrates. Consequently, the separator may be maintained at the temperature produced by the expansion.

The cold separated gas is discharged from the cold zone 13 in the top of the separator through a duct 21. The cold separated gas may be discharged at a suitable pressure for introduction into a gas sales delivery line or the gas may be used for repressuring the producing formation with preferably a single compressing stage.

Owing to the low temperatures maintained in the separator, much of the light hydrocarbons (propane and lighter) condense with the heavier hydrocarbons. This may be expected and cannot be eliminated when greater condensate of the heavier hydrocarbons is desired. Consequently, the liquids discharged through the duct 18 consist of a mixture of hydrocarbons, containing quantities of light hydrocarbons, for example propane and lighter hydrocarbons, and if placed in storage at substantially atmospheric temperatures and pressures, the high vapor pressure components such as the propanes and lighter hydrocarbons flash out and carry therewith the valuable low vapor pressure components which were recovered in the low temperature separator 12. This loss in the valuable hydrocarbons becomes substantially greater as lower and lower temperatures are maintained to increase the amount of condensate. Consequently, the increased recovery brought about by the substantially low temperature made possible by the presence of the inhibitor would be disappointing and not in keeping with the actual quantity of condensate obtained from such low temperatures.

In accordance with the present invention, the condensate discharged from the separator 12 is stabilized in a simple stabilizer 22. The stabilizer includes an elongated tower 23 having a vapor space 24 at its upper end, a lower contact section 25, and a bottom liquid collecting space 26. The cold hydrocarbon liquid and glycol mixture from the duct 18 is flashed into the stabilizer because of a lower pressure maintained in the vapor space 24.

It is obvious that the temperature within the vapor space 24 approaches the temperature of the cold liquid mixture that is flashed therein. This is an important feature in that it makes a simple stabilizer possible because reflux liquids are not required in obtaining the required fractionation. The cold upper end of the stabilizer cooperates with a hot lower bottom portion to give a stabilized product as now to be described:

The liquids reaching the bottom portion of the stabilizer are heated to provide hydrocarbon vapors which ascend in contact with the descending liquid mixtures that move downwardly in the stabilizer. The liquid mixtures traveling toward the heated bottom are brought to their boiling point and the vapors traveling toward the cold end are brought to their dew point. As a result part of the vapor is condensed to gravitate to the bottom of the stabilizer and a part of the liquid is vaporized. Repeated contact results in a vapor stream which on reaching the top of the stabilizer contains most of the high vapor pressure components (propane or lighter) and a liquid product at the bottom of the stabilizer which contains mostly low vapor pressure components (butane, pentane, etc.).

In the illustrated instance, the heat is supplied to the stabilizer by an indirectly fired salt-bath heater 27 which is connected with a collecting tray 28 that is located in the stabilizer below the contact section 25. The liquid to be heated is drawn from the tray 28 through a pipe 29 that is connected with the heater 27 and the hot oil, including vaporized portions, is returned to the bottom of the stabilizer through a pipe 30. The vapors, and those evolved from the hot oil in the bottom of the stabilizer, rise upwardly through a flue 31 in the tray and furnish the contact vapor, as above described. The light vapors reaching the top of the stabilizer are discharged through a pipe 32 under control of a pressure regulating valve 33 and may be utilized as fuel for supplying the burner of the heater 27 or may be compressed to sales line pressure and combined with the gas from the separator 12. The bottom product of the stabilizer is discharged through a pipe 34 having a valve 35 which is actuated responsive to the level of the liquid product maintained in the stabilizer by means of a liquid level controller 36. The hot liquid product discharged through the pipe 34 may be initially cooled by passing it through an air cooler 37, after which it is brought to the temperature which is to be maintained in the stock tank by passing the liquid product through a heat exchanger 38 that is connected into the line 34 between the air cooler 37 and the control valve 35. The cooled stabilized liquid product will remain liquid and will have essentially no vapor losses at atmospheric temperature and stock tank pressure.

The cooling medium utilized in the heat exchanger 38 comprises the cold gas discharged from the separator 12 through the pipe 21 which is connected with the heat exchanger 38. After passing through the heat exchanger 38 the gas contains sufficient cold to provide the cooling medium for the heat exchanger 9 previously described. In order to control temperature of the influent gas passed through the heat exchanger 9, a portion of the cold gas may be passed around the heat exchanger through a by-pass 39. The amount of cold gas in excess of that required in the heat exchanger 9 is discharged through the by-pass 39 under control of a valve 40 actuated by a temperature regulator 41 responsive to the temperature of the gas being discharged to the expansion valve 10.

The glycol containing the water vapor separates from the hydrocarbons incidental to heat in the stabilizer and may be collected from the stabilizer by means of a tray 42 that is located above the tray 28 previously described. The glycol containing the water vapor is drawn from the tray through a pipe 43 and collected in an accumulator 44. The glycol is drawn from the accumulator through a pipe 45 which connects with the pipe 15. The pipe 15 is connected with a reboiler 46 wherein mixture is heated to drive off the water vapor in the form of steam, the steam being discharged through a duct 47. The reactivated glycol being free of water vapor it passes from the reboiler through a pipe 48 which connects with a pump 49 which injects the glycol into the pipe 8 at a pressure sufficient for recirculation with the incoming gas. The heat of the stabilizer is thus utilized in effecting separation of the glycol from the liquid hydrocarbon product so that substantially none of the glycol is lost from the system.

Figure 2:
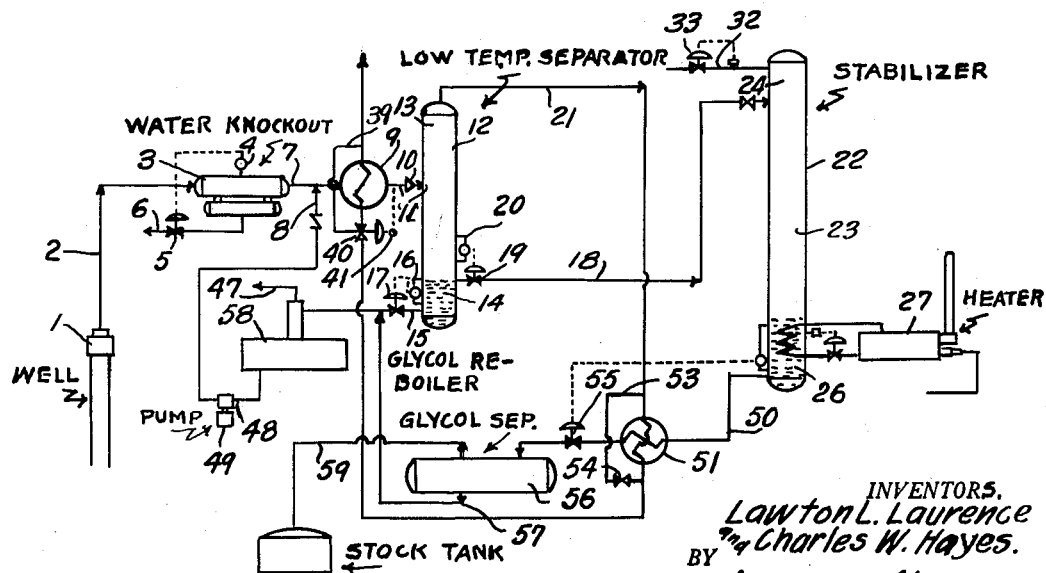
Fig. 2 is a similar view of a modified form of apparatus and method for carrying out the present invention.

The form of the invention as illustrated in Fig. 2 is substantially the same as the form of the invention just described, with the exception that the glycol which contains the water vapor is allowed to collect in the bottom of the stabilizer and is drawn off with the stabilized hydrocarbon product through a pipe 50, which conducts the hot liquids through a heat exchanger 51 corresponding with the heat exchanger 38, previously described. The temperature in the heat exchanger 51 is controlled by passing only a predetermined amount of the cold gas through the heat exchanger and the remainder through a bypass 53 under control of a valve 54. The cooled liquids are discharged from the heat exchanger 51 through a pipe 55 which is connected with a separator 56 wherein the glycol containing the absorbed water vapor separates from the oil and is discharged from the bottom of the separator through a pipe 57 which leads to the glycol reboiler 58, which corresponds with the glycol reboiler previously described. The separated hydrocarbon product is removed from the separator 56 through a pipe 59 that leads to the stock tank. The other parts of the apparatus illustrated in Fig. 2 are identical with the corresponding parts of the first form of the invention and like numerals of reference are applied thereto.

A variation in the above described equipment is that the heat exchange between the cold separated gas and the hot stabilized hydrocarbon product may be effected by reversing the order of circulation of the cold gas through the respective heat exchangers without departing from the spirit of the invention.

From the foregoing it is obvious that we have provided a high pressure low temperature separating apparatus and method in combination with a stabilizing apparatus and method by which maximum condensate recovery is effected at lower temperatures without danger of free-up through formation of gas hydrates in the low temperature system through the utilization of the hydrate inhibitor, and that by which the recovered condensate is stabilized to eliminate the portions of the condensate which would ordinarily bring about loss of the valuable hydrocarbon liquids from the stock tank. Another important feature of the invention is that the top portion of the stabilizer is maintained at a low temperature to prevent vaporization and loss of desirable hydrocarbons along with the undesirable hydrocarbon vapors. It is also obvious that the heat in the stabilizer is utilized to effect maximum separation of the glycol from the condensate as in the first described form of the invention, and from the stabilized hydrocarbon product as in the second described form of the invention.

What we claim and desire to secure by Letters Patent is:

1. The method of producing a stabilized hydrocarbon liquid product from a high pressure hydrocarbon fluid stream including, injecting a gas hydrate inhibitor into the fluid stream for absorption of water and water vapor of said stream, cooling the fluid stream in the presence of said hydrate inhibitor to effect condensation of desirable liquefiable hydrocarbon content of the fluid stream without formation of objectionable gas hydrates, flashing the hydrocarbon condensate and inhibitor mixture into a stabilizing zone of lower pressure, heating liquid collecting in a lower portion of the stabilizing zone, passing hot vapors evolved from said heating step into counterflow contact with the hydrocarbon condensate and hydrate inhibitor mixture within said stabilizing zone to form a stabilized liquid hydrocarbon product, separating the hydrate inhibitor after heating thereof by the heat of said stabilizing zone, reactivating the hydrate inhibitor by removing the absorbed water and water vapor, and recycling the reactivated hydrate inhibitor for recontact with the influent hydrocarbon fluid stream.

2. The method of producing a stabilized hydrocarbon liquid product from a high pressure hydrocarbon fluid stream including, injecting a gas hydrate inhibitor into the fluid stream for absorption of water and water vapor of said stream, cooling the fluid stream in the presence of said hydrate inhibitor to effect condensation of desirable liquefiable hydrocarbon content of the fluid stream without formation of objectionable gas hydrates, flashing the hydrocarbon condensate and inhibitor mixture into a stabilizing zone of lower pressure, heating liquid collecting in a lower portion of the stabilizing zone, passing hot vapors evolved from said heating step into counterflow contact with the hydrocarbon condensate and hydrate inhibitor mixture within said stabilizing zone to form a stabilized liquid hydrocarbon product, separating the hydrate inhibitor from the hydrocarbons within the stabilizing zone after being heated through contact with the hot vapors, removing the hydrate inhibitor from the stabilizing zone, reactivating the hydrate inhibitor by removing the absorbed water and water vapor, and recycling the reactivated hydrate inhibitor for recontact with the influent hydrocarbon fluid stream.

3. The method of producing a stabilized hydrocarbon liquid product from a high pressure hydrocarbon fluid stream including, injecting a gas hydrate inhibitor into the fluid stream for absorption of water vapor and vapor of said stream, cooling the fluid stream in the presence of said hydrate inhibitor to effect condensation of desirable liquefiable hydrocarbon content of the fluid stream without formation of objectionable gas hydrates, flashing the hydrocarbon condensate and inhibitor mixture into a stabilizing zone of lower pressure, heating liquid collecting in a lower portion of the stabilizing zone, passing hot vapors evolved from said heating step into counterflow contact with the hydrocarbon condensate and hydrate inhibitor mixture within said stabilizing zone to form a stabilized liquid hydrocarbon product, removing hot stabilized hydrocarbon and hydrate mixture from the stabilizing zone, separating the stabilized liquid hydrocarbon from the hydrate inhibitor of the mixture to provide said product, reactivating the hydrate inhibitor by removing the absorbed water and water vapor, and recycling the reactivated hydrate inhibitor for recontact with the influent hydrocarbon fluid stream.

4. The method of producing a stabilized hydrocarbon liquid product from a high pressure hydrocarbon fluid stream including, injecting a gas hydrate inhibitor into the fluid stream for absorption of water and water vapor of said stream, cooling the fluid stream in a separating and condensing zone in the presence of said hydrate inhibitor to chill the fluid stream and effect condensation of liquefiable hydrocarbon content of the fluid stream without formation of objectionable gas hydrates, separating the major part of the hydrate inhibitor from the condensate, flashing the hydrocarbon condensate and hydrate inhibitor remaining in the mixture therewith from the separating and condensing zone to a stabilizing zone of lower pressure, heating liquid collecting in a lower portion of the stabilizing zone, passing hot vapors evolved from said heating step into counterflow contact with the hydrocarbon condensate and hydrate inhibitor mixture within said stabilizing zone to form a stabilized liquid hydrocarbon product, separating the hydrate inhibitor after heating thereof by the heat of the stabilizing zone, combining the last separated hydrate inhibitor with the first separated hydrate inhibitor, reactivating the combined inhibitor to remove the water and water vapor therefrom, and recycling the reactivated hydrate inhibitor for recontact with the influent hydrocarbon fluid stream.

5. The method of producing a stabilized hydrocarbon liquid product from a high pressure hydrocarbon fluid stream including, injecting a gas hydrate inhibitor into the fluid stream for absorption of water and water vapor of said stream, cooling the fluid stream in a separating and condensing zone in the presence of said hydrate inhibitor to chill the fluid stream and effect condensation of liquefiable hydrocarbon content of the fluid stream without formation of objectionable gas hydrates, separating the major part of the hydrate inhibitor from the condensate, flashing the hydrocarbon condensate and hydrate inhibitor remaining in the mixture therewith from the separating and condensing zone to a stabilizing zone of lower pressure, heating liquid collecting in a lower portion of the stabilizing zone, passing hot vapors evolved from said heating step into counterflow contact with the hydrocarbon condensate and hydrate inhibitor mixture within said stabilizing zone to form a stabilized liquid hydrocarbon product, separating the hydrate inhibitor from the hydrocarbons within the stabilizing zone after being heated through contact with the hot vapors, removing the hydrate inhibitor from the stabilizing zone, combining the last separated hydrate inhibitor with the first separated hydrate inhibitor, reactivating the combined inhibitor to remove the water and water vapor therefrom, and recycling the reactivated hydrate inhibitor for recontact with the influent hydrocarbon fluid stream.

6. The method of producing a stabilized hydrocarbon liquid product from a high pressure hydrocarbon fluid stream including, injecting a gas hydrate inhibitor into the fluid stream for absorption of water and water vapor of said stream, cooling the fluid stream in a separating and condensing zone in the presence of said hydrate inhibitor to chill the fluid stream and effect condensation of liquefiable hydrocarbon content of the fluid stream without formation of objectionable gas hydrates, separating the major part of the hydrate inhibitor from the condensate, flashing the hydrocarbon condensate and hydrate inhibitor remaining in the mixture therewith from the separating and condensing zone to a stabilizing zone of lower pressure, heating liquid collecting in a lower portion of the stabilizing zone, passing hot vapors evolved from said heating step into counterflow contact with the hydrocarbon condensate and hydrate inhibitor mixture within said stabilizing zone to form a stabilized liquid hydrocarbon product, removing the hot stabilized hydrocarbon and inhibitor mixture from the zone of stabilization, separating the stabilized hydrocarbon from the hydrate inhibitor of the mixture to provide said product, combining the last separated hydrate inhibitor with the first separated hydrate inhibitor, reactivating the combined inhibitor to remove the water and water vapor therefrom, and recycling the reactivated hydrate inhibitor for recontact with the influent hydrocarbon fluid stream.

7. The method of producing a stabilized hydrocarbon liquid product from a high pressure hydrocarbon fluid stream including, injecting a gas hydrate inhibitor into the fluid stream for absorption of water and water vapor of said stream, cooling the fluid stream in the presence of said hydrate inhibitor to effect condensation of desirable liquefiable hydrocarbon content of the fluid stream without formation of objectionable gas hydrates, flashing the hydrocarbon condensate and inhibitor mixture into a stabilizing zone of lower pressure, heating liquid collecting in a lower portion of the stabilizing zone, passing hot vapors evolved from said heating step into counterflow contact with the hydrocarbon condensate and hydrate inhibitor mixture within said stabilizing zone to form a stabilized liquid hydrocarbon product, and separating the hydrate inhibitor from the stabilized hydrocarbon after receiving heat of said stabilizing zone.

8. The method of producing a stabilized hydrocarbon liquid product from a high pressure hydrocarbon fluid stream including, injecting a gas hydrate inhibitor into the fluid stream for absorption of water and water vapor of said stream, cooling the fluid stream in the presence of said hydrate inhibitor to effect condensation of desirable liquefiable hydrocarbon content of the fluid stream without formation of objectionable gas hydrates, flashing the hydrocarbon condensate and inhibitor mixture into a stabilizing zone of lower pressure, heating liquid collecting in a lower portion of the stabilizing zone, passing hot vapors evolved from said heating step into counterflow contact with the hydrocarbon condensate and hydrate inhibitor mixture within said stabilizing zone to form a stabilized liquid hydrocarbon product, separating the hydrate inhibitor from the hydrocarbons within the stabilizing zone after being heated through contact with the hot vapors, and separately removing the hydrate inhibitor and stabilized hydrocarbon from the stabilizing zone.

9. The method of producing a stabilized hydrocarbon liquid product from a high pressure hydrocarbon fluid stream including, injecting a gas hydrate inhibitor into the fluid stream for absorption of water and water vapor of said stream, cooling the fluid stream in the presence of said hydrate inhibitor to effect condensation of desirable liquefiable hydrocarbon content of the fluid stream without formation of objectionable gas hydrates, flashing the hydrocarbon condensate and inhibitor mixture into a stabilizing zone of lower pressure, heating liquid collecting in a lower portion of the stabilizing zone, passing hot vapors evolved from said heating step into counterflow contact with the hydrocarbon condensate and hydrate inhibitor mixture within said stabilizing zone to form a stabilized liquid hydrocarbon product, removing hot stabilized hydrocarbon and hydrate mixture from the stabilizing zone, and separating the hydrate inhibitor of the mixture to provide said product.

10. In an apparatus for producing a stabilized hydrocarbon product from a high pressure hydrocarbon fluid stream, a combination separator and condenser, means for conducting the hydrocarbon fluid stream to the combination separator and condenser, means for injecting a hydrate inhibitor into the hydrocarbon fluid stream, means in the conducting means for expanding the hydrocarbon fluid stream containing the hydrate inhibitor into the combination separator and condenser to chill the fluid stream and effect condensation of liquefiable hydrocarbon content of the fluid stream without formation of objectionable gas hydrates, a stabilizer, means for conducting and flashing hydrocarbon condensate and hydrate inhibitor mixture from the combination separator and condenser into an upper portion of the stabilizer, means for heating liquid collecting in the lower portion of the stabilizer, liquid and vapor contact means in the stabilizer for counter-currently contacting vapors evolved from heating of the liquid with the hydrocarbon condensate and inhibitor mixture, means associated with said stabilizer for collecting and separating the hydrate inhibitor from the stabilized hydrocarbon product, a reactivator for the hydrate inhibitor in connection with the inhibitor separating means, and means connecting said reactivator with the injection means for supplying the hydrate inhibitor to the influent hydrocarbon fluid stream.

11. In an apparatus for producing a stabilized hydrocarbon product from a high pressure hydrocarbon fluid stream, a combination separator and condenser, means for conducting the hydrocarbon fluid stream to the combination separator and condenser, means for injecting a hydrate inhibitor into the hydrocarbon fluid stream, means in the conducting means for expanding the hydrocarbon fluid stream containing the hydrate inhibitor into the combination separator and condenser to chill the fluid stream and effect condensation of liquefiable hydrocarbon content of the fluid stream without formation of objectionable gas hydrates, a stabilizer, means for conducting and flashing the hydrocarbon condensate and hydrate inhibitor mixture from the combination separator and condenser into an upper portion of the stabilizer, means for heating liquid collecting in the lower portion of the stabilizer, liquid and vapor contact means in the stabilizer for countercurrently contacting vapors evolved from heating of the liquid with the hydrocarbon condensate and inhibitor mixture, means associated with said contact means at a point above the level at which the heated liquid collects for collecting separated hydrate inhibitor, means connected with the stabilizer for separately removing the stabilized product and said hydrate inhibitor from the stabilizer, a reactivator for the hydrate inhibitor in connection with the inhibitor removing means, and means connecting the reactivator with the injection means for supplying the hydrate inhibitor to the influent hydrocarbon fluid stream.

12. In an apparatus for producing a stabilized hydrocarbon product from a high pressure hydrocarbon fluid stream, a combination separator and condenser, means for conducting the hydrocarbon fluid stream to the combination separator and condenser, means in said conducting means for injecting a hydrate inhibitor into the hydrocarbon fluid stream, means in the conducting means for expanding the hydrocarbon fluid stream containing the hydrate inhibitor into the combination separator and condenser to chill the fluid stream and effect condensation of liquefiable hydrocarbon content of the fluid stream without formation of objectionable gas hydrates, a stabilizer, means for conducting and flashing hydrocarbon condensate and hydrate inhibitor mixture from the combination separator and condenser into an upper portion of the stabilizer, means for heating liquid collecting in the lower portion of the stabilizer, liquid and vapor contact means in the stabilizer for countercurrently contacting vapors evolved from heating of the liquid with the hydrocarbon condensate and inhibitor mixture, a separator for separating the hydrate inhibitor from the stabilized hydrocarbon product, duct means connecting the last-named separator with said stabilizer for conducting the hydrate inhibitor and stabilized hydrocarbon mixtures to said separator, means connected with said last-named separator for separately removing the stabilized product and said hydrate inhibitor, a reactivator with the inhibitor for reactivating the hydrate inhibitor, a flow connection between the reactivator and low pressure separator to conduct the hydrate inhibitor to the reactivator, and duct means connecting the reactivator with the injection means for supplying the hydrate inhibitor to the influent hydrocarbon fluid stream.

13. In an apparatus for producing a stabilized hydrocarbon product from a high pressure hydrocarbon fluid stream, a high pressure separator and condenser, means for conducting the hydrocarbon fluid stream to the high pressure separator-condenser, means in said conducting means for injecting a hydrate inhibitor into the hydrocarbon fluid stream, means in the conducting means for expanding the hydrocarbon fluid stream containing the hydrate inhibitor into the high pressure separator-condenser to chill the fluid stream and effect condensation of liquefiable hydrocarbon content of the fluid stream without formation of objectionable gas hydrates, a stabilizer, means for conducting and flashing hydrocarbon condensate and hydrate inhibitor mixture from the high pressure separator-condenser into an upper portion of the stabilizer, means for heating liquid collecting in the lower portion of the stabilizer, liquid and vapor contact means in the stabilizer for countercurrently contacting vapors evolved from heating of the liquid with the hydrocarbon condensate and inhibitor mixture, a low pressure separator for separating the hydrate inhibitor from the stabilized hydrocarbon product, duct means connecting the low pressure separator with said stabilizer for conducting the hydrate inhibitor and stabilized hydrocarbon mixture to said separator, a cooler in the duct means for cooling the mixture prior to reducing pressure of the mixture, pressure reduction means in said duct means between the cooling means and the low pressure separator, means connected with said low pressure separator for separately removing the stabilized product and said hydrate inhibitor, a reactivator for the hydrate inhibitor, duct means connecting the low pressure separator with the reactivator, and duct means connecting the reactivator with the injection means for supplying reactivated hydrate inhibitor to the influent hydrocarbon fluid stream.

14. The method of producing a stabilized hydrocarbon liquid product from a high pressure hydrocarbon fluid stream including injecting a gas hydrate inhibitor into the fluid stream, expanding the fluid of said stream into a separating and condensing zone in the presence of said inhibitor to chill the fluid and effect a maximum condensation of liquefiable hydrocarbon content of the fluid stream without formation of objectional gas hydrates, flashing the hydrocarbon condensate and inhibitor mixture from the separating and condensing zone into a stabilizing zone of lower pressure, heating the liquid collecting in a lower portion of the stabilizing zone, passing the vapors evolved from said heating step into counterflow with the hydrocarbon condensate and inhibitor mixture in the stabilizing zone to form a stabilized liquid hydrocarbon product and effect separation of the inhibitor, separately removing the hot stabilized product and said inhibitor from the zone of stabilization, removing cold separated gas from said separating and condensing zone, passing the cold separated gas into heat exchange relation with the hot stabilized product to cool said product, and reactivating the inhibitor for recontact with influent gas.

References Cited in the file of this patent

UNITED STATES PATENTS

| | | |
|---|---|---|
| 2,151,248 | Vaughan | Mar. 21, 1939 |
| 2,156,234 | Bays | Apr. 25, 1939 |
| 2,214,678 | Raigorodsky | Sept. 10, 1940 |
| 2,245,028 | Farris | June 10, 1941 |
| 2,342,165 | Plummer | Feb. 22, 1944 |
| 2,617,276 | Gard et al. | Nov. 11, 1952 |